United States Patent [19]

Lubiarz

[11] Patent Number: 4,859,125
[45] Date of Patent: Aug. 22, 1989

[54] HELICAL BROACH PULLER

[75] Inventor: Arthur F. Lubiarz, Troy, Mich.

[73] Assignee: Crankshaft Machine Company, Jackson, Mich.

[21] Appl. No.: 264,777

[22] Filed: Oct. 31, 1988

[51] Int. Cl.⁴ .................................. B23D 41/04
[52] U.S. Cl. ........................ 409/287; 279/1 DC; 279/74; 279/82
[58] Field of Search ............ 409/244, 256, 276, 281, 409/282, 287, 231, 232, 234; 279/1 B, 1 DC, 57, 74, 75, 78, 82

[56] References Cited

U.S. PATENT DOCUMENTS

| | | | |
|---|---|---|---|
| 1,345,583 | 7/1920 | Church | 279/74 |
| 3,684,302 | 8/1972 | Herman | 279/75 |
| 3,741,573 | 6/1973 | Treer | 279/75 X |
| 4,180,360 | 12/1979 | Dopp | 409/287 |

FOREIGN PATENT DOCUMENTS

| | | | |
|---|---|---|---|
| 2413021 | 10/1975 | Fed. Rep. of Germany | 279/82 |
| 396208 | 1/1974 | U.S.S.R. | 279/1 DC |

*Primary Examiner*—Z. R. Bilinsky
*Attorney, Agent, or Firm*—Beaman & Beaman

[57] ABSTRACT

Broach pulling apparatus which eliminates play and backlash during the broach operation. Jaws carried by the broach pulling spindle engage the broach in a manner to impose axial forces thereon in opposite directions to eliminate lost motion and clearances between the spindle and the broaching tool during cutting and alignment.

10 Claims, 2 Drawing Sheets

HELICAL BROACH PULLER

BACKGROUND OF THE INVENTION

In a broach pulley tool an axially displaceable spindle grasps the end region of a broach and pulls the broach through the workpiece to remove metal. Keyways, splines and other configurations are often formed in the bore of workpieces by broach pullers.

Some workpieces, such as the gearing used in transmissions, requires an internal spiral spline and such helical splines can be formed by broach pulling machine tools by rotating the spindle and tool as the tool is axially displaced. In such instances rotational orientation is often required between the configuration of the workpiece bore and other configurations defined on the workpiece, such as gear teeth defined on the workpiece periphery.

The connection between the operating spindle and the broach tool is usually by the use of jaws carried by the spindle engaging an annular recess within the tool end region. The jaws engage an oblique surface defining the edge of the recess nearest the broach end, and while the jaws are able to impose sufficient axial force on the tool to provide cutting, the axial dimension of the jaws is less than that of the recess and an axial lost motion between the tool and spindle occurs. This lost motion or clearance between the spindle and tool, even though the tool is keyed to prevent relative rotation with respect to the spindle, results in inaccuracies occurring between the resultant cut and the desired location of the cut on the workpiece. Such inaccuracies are particularly significant when utilizing a helical broach as the spindle and broach are rotated during cutting, and with previous broaching equipment it is necessary to compensate for this problem by locating the workpiece relative to the tool in a predetermined manner, or by other less than desired procedures.

A number of devices have been used to interconnect broaches and spindles as shown in U.S. Pat. Nos. 1,984,104; 2,135,157; 2,135,861; 3,199,409; 4,180,360 and 4,266,894. However, none of these devices are capable of removing the inaccuracies and lost motion presently attendant with broaching tools, particularly rotary helical broaching tools.

It is an object of the invention to provide a helical broach puller which eliminates axial lost motion and play between the pulling spindle and broaching tool.

It is another object of the invention to provide a helical broach puller utilizing spindle mounted radially displaced jaws engagable with an annular recess within the broach end region wherein radial jaw displacement prevents relative axial movement between the spindle and broaching tool.

An additional object of the invention is to provide a broach puller having jaws engagable with the broach at spaced axial positions wherein the jaws are operated by a common actuator and are sequentially actuated.

Yet a further object of the invention is to provide a broach puller utilizing axially spaced jaws for engaging the broach at axially spaced locations to eliminate relative axial displacement between the spindle and broach and wherein positive metal-to-metal locking relationships between the jaws and broach is achieved.

A broach of the type utilized with the concept of the invention includes a cylindrical end region having a recess defined therein wherein the recess configuration includes oblique shoulders. In the usual construction the broach machine tool includes a rotatable spindle having a socket receiving the broach tool end region and radially movable jaws defined in the spindle engage the tool recess shoulder closest to the tool end for interconnecting the spindle and tool and permitting an axial pulling force to be applied to the tool. The radial position of the jaw is determined by an axially displaceable cam.

In accord with the invention a second set of radially movable jaws is defined upon the spindle axially displaced from the first set of jaws and in alignment with the tool recess shoulder not engaged by the first jaw set. The second set of jaws produces an axial force on the tool in an opposite direction to the axial force imposed on the tool by the first jaw set. Thus, engagement of both sets of jaws with opposite sides of the tool recess eliminates any play, clearance or lost motion between the spindle and tool in the axial direction. This relationship permits both the axial and rotative relationship of the spindle and tool to be accurately controlled and determined, overcoming previous alignments and orientation problems.

Both sets of jaws are operated by an annular cam sleeve axially displaceable on the spindle. Compression springs bias the cam sleeve in the direction inwardly radially displacing the jaw sets, while a sleeve abutment is engaged during spindle displacement in a non-broaching direction to compress the sleeve springs and permit retraction of the jaw sets for removal of the tool from the spindle socket.

BRIEF DESCRIPTION OF THE DRAWINGS

The aforementioned objects of the invention will be appreciated from the following description and accompanying drawings wherein.

DESCRIPTION OF THE PREFERRED EMBODIMENT

Figure 1:
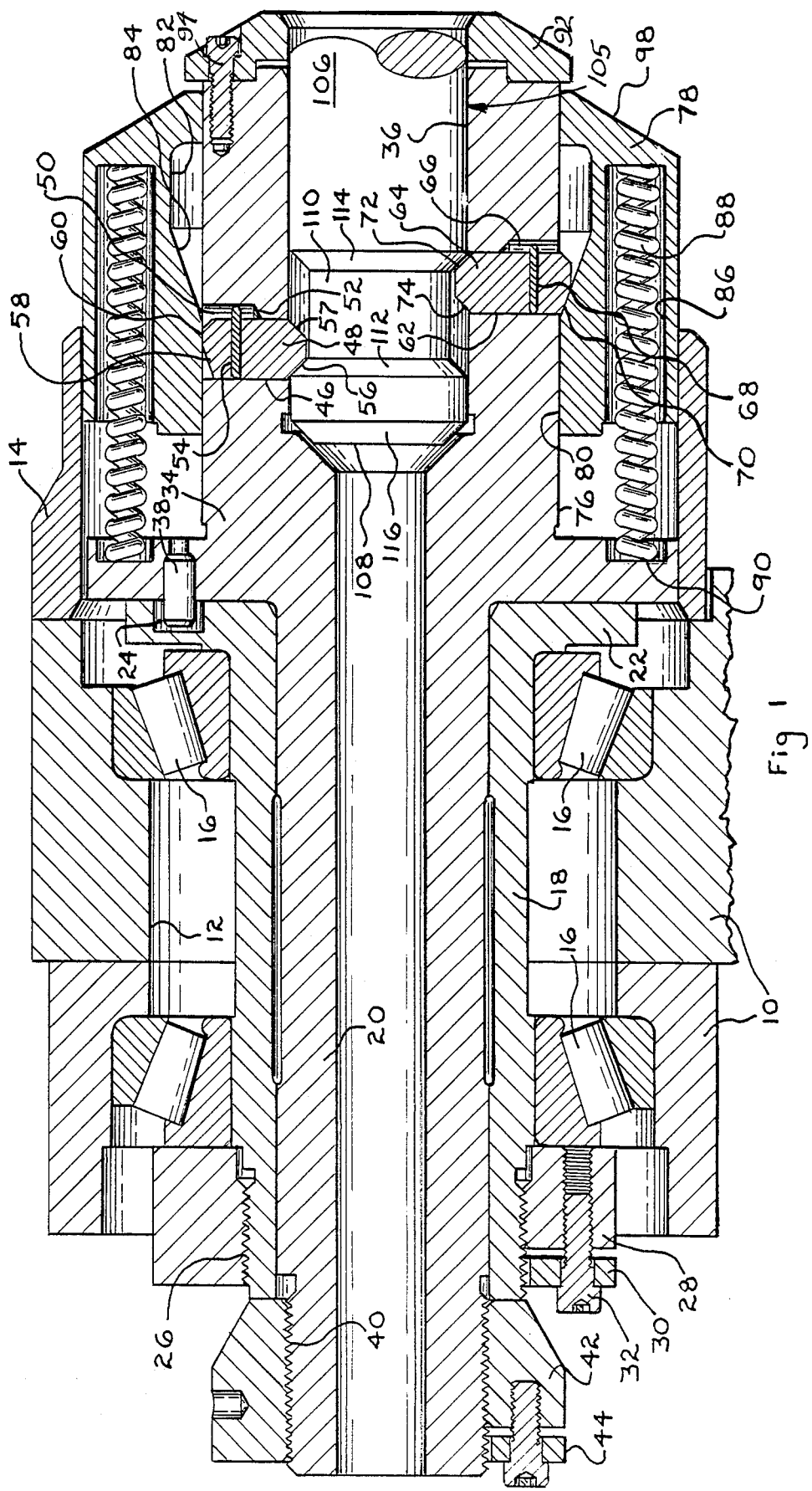
FIG. 1 is a diametrical sectional view of a broach puller spindle constructed in accord with the invention illustrating a broach received within the spindle socket and the jaws in the operative pulling position as taken along Section I—I of FIG. 2.
Figure 2:
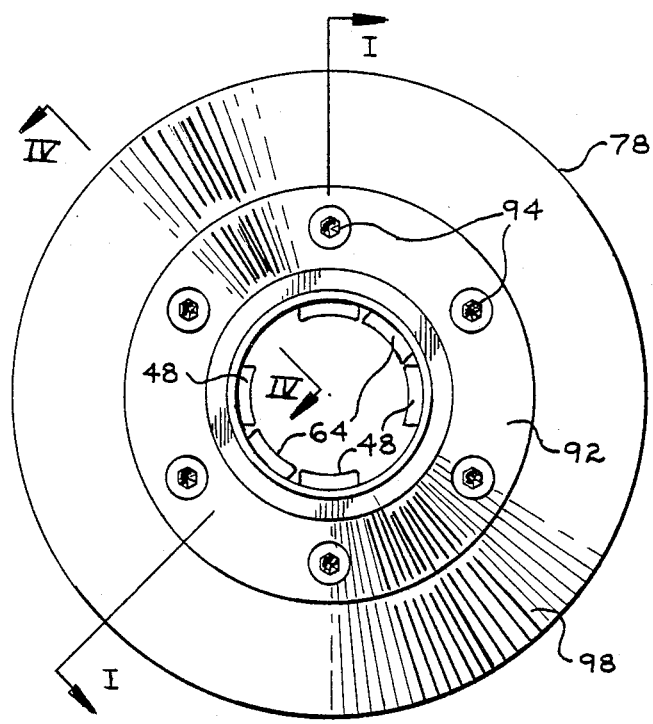
FIG. 2 is an end elevational view as taken from the right end of FIG. 1.

Broach pulling machine tools may take a variety of forms, and may have a plurality of work stations or spindles. As the inventive concepts are practiced at an individual spindle the disclosure of the invention is with respect to a single spindle and it will be understood that in multiple spindle machines each spindle will be constructed in accord with the described disclosure.

The machine frame is represented at 10 and includes a cylindrical bore 12, and an annular extension 14 extends toward the spindle head as will be apparent from the drawings. A pair of roller bearing assemblies 16 are mounted within the frame bore 12 and rotatably support the tubular spindle tube 18 which supports the spindle 20. The spindle tube 18 includes a radial flange 22 having a blind hole 24 formed therein, and the other end of the spindle tube is threaded at 26 to receive the threaded collar 28 whereby tightening of the collar will firmly axially position the spindle tube within the bearings 16, and also aid in maintaining the bearings within the machine frame. A lock washer 30 held in position by screw 32 prevents accidental rotation of the collar 28.

The spindle 20 includes an enlarged head 34 having a coaxial socket 36 which intersects the spindle outer end. A pin 38 is defined within a hole in the head 34 and is received within the spindle tube hole 24 to lock the spindle tube and spindle against relative rotation about the spindle axis.

The spindle 20 is threaded at 40 for receiving the annular threaded collar 42 which bears against the end of the spindle tube 18 and maintains the assembly of the spindle and spindle tube, and rotation of the collar 42 is controlled by the thread lock structure 44.

Four radial openings 46 are defined in the spindle head 34 intersecting the socket 36. The openings 46 are spaced at 90 degree intervals and each receives a radially displaceable jaw 48. A slot 50 is defined in each opening 46 having a shoulder 52, and a pin 54 mounted in each jaw has an end received within a slot 50 to limit inward movement of the jaws 48.

At its inner end, each jaw 48 is formed with an oblique surface 56, and at its outer end each jaw 48 is provided with an oblique cam surface 58 and a cylindrical surface 60 corresponding with the bore of the cam sleeve as will be later apparent.

The spindle head 34 is also provided with a pair of radial openings 62 diametrically related to each other. The openings 62 each slidably receive a jaw 64, and the openings are each provided with a slot 66 for receiving a jaw mounted pin 68 to limit inward movement of the jaws 64. At its outer end, each jaw 64 is provided with an oblique surface 70, and at its inner end each jaw includes oblique surfaces 72 and 74.

The spindle head includes a cylindrical surface 76 upon which the annular cam sleeve 78 is axially slidable. The cam sleeve 78 includes a bore slidably received on surface 76, and an annular recess 82 is defined within the cam sleeve intersecting the bore 80. The recess 82 includes a tapered cam surface 84.

The cam sleeve 78 also includes a plurality of axially extending bores 86 for receiving compression springs 88, and the other end of the compression springs engage the head recesses 90.

An annular cap 92 is bolted upon the end of the spindle head by bolts 94, and the purpose of the cap 92 is to limit outward movement of the cam sleeve upon the spindle head.

Figure 3:
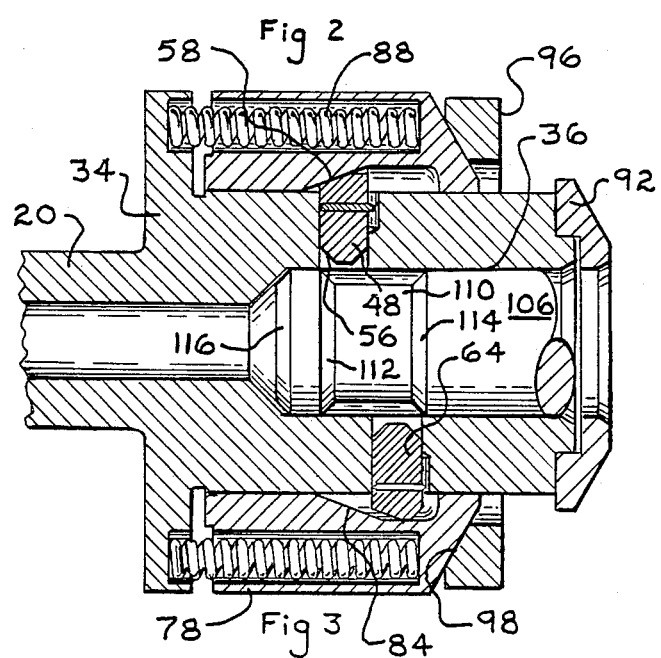
FIG. 3 is a diametrical, elevational, sectional view of the spindle end adjacent its socket illustrating the cam sleeve in the retracted position for retracting the jaws.

The broach machine includes a stop ring 96, FIG. 3, which is mounted upon the machine frame in alignment with the cam sleeve surface 98, and upon the spindle being axially displaced to the right such that the stop ring 96 engages the surface 98, the cam sleeve 78 will be axially displaced with respect to the spindle head.

Figure 4:
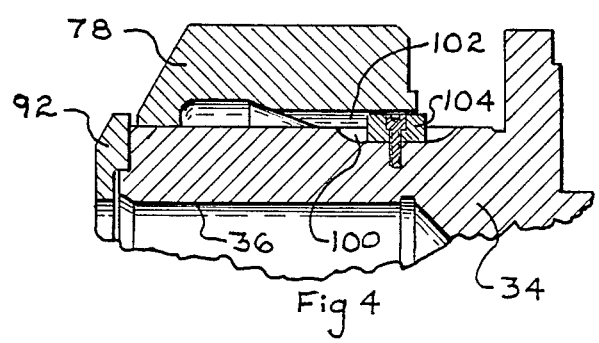
FIG. 4 is a detail, sectional view as taken along Section IV—IV of FIG. 2.

Relative rotational movement of the spindle head 34 relative to the cam sleeve 78 is prevented by the utilization of a keyway 100 defined in the spindle head, FIG. 4, and a keyway 102 defined in the cam sleeve, both of which receive the key 104 bolted within keyway 100.

A typical broach tool as used with the aforedescribed apparatus is disclosed in FIGS. 1 and 3. The broach tool 105 is of an elongated form having broach teeth defined thereon, not shown, and the broach is of a conventional construction including a cylindrical end region 106 which terminates at an end 108. A cylindrical recess 110 is located in the end region 106 and is defined by an annular conical shoulder surface 112 adjacent the end 108 and a similar conical shoulder surface 114 adjacent the end region 106. Also, the broach includes a conical bevel surface 116 intersecting the end 108.

It is to be understood that the frame 10, and the entire spindle assembly, is mounted upon a slide or equivalent apparatus which permits the spindle to be displaced in an axial direction, and such apparatus for mounting the spindle frame is conventional and forms no part of the present invention. Upon the spindle assembly being moved to its right the maximum extent, the cam sleeve surface 98 will engage the stop ring 96 and further movement of the spindle will push the spindle head 34 "through" the cam sleeve 78 wherein the components will be as disclosed in FIG. 3. In this relationship the surfaces 58 of the jaws 48 will be engaging the cam sleeve surfaces 84, and the outer end of the jaws 64 will be in alignment with the recess 82. Thereupon, upon insertion of the broach tool end region 106 into the spindle socket 36 the tool surface 116 will engage the surface 72 of the jaw 64 and displace the same outwardly. Further insertion of the broach into the socket 36 causes the surface 116 to engage the oblique surface 57 defined on the jaws 48 forcing the jaws 48 outwardly permitting the broach end region 106 to be fully received within the socket 36 to the extent shown in FIG. 3.

The spindle assembly is then moved to the right permitting the cam sleeve 78 to move to the right on the head surface 76 under the influence of the compression springs 88. Such relative movement between the cam sleeve 78 and the spindle head, first, radially displaces the jaws 48 inwardly as the jaw surfaces 58 are engaged by the cam sleeve surface 84. Further movement of the cam sleeve relative to the spindle causes the jaw surfaces 60 to align with and be engaged by the cam sleeve bore 80 thereby locking the radial position of the jaws 48. At such time the cam surfaces 56 will be in firm engagement with the broach stop shoulder 112.

Further relative movement of the cam sleeve 76 on the spindle head causes the cam surface 84 to engage the oblique surfaces 70 on the jaws 64 forcing the jaws 64 inwardly until the jaw surfaces 72 engage the broach tool stop shoulder 114. This engagement of the surfaces 72 and 114 terminates inward movement of the jaws 64, which have not "bottomed" on the recess 110, and prevents further movement of the cam sleeve 78 under the influence of the compression springs 88.

The engagement of the jaws 48 with the broach tool surface 112 provides the positive metal-to-metal engagement between the spindle and the broach tool to permit the broaching action to occur as the spindle assembly is drawn to the left, FIG. 1. The engagement of the surface 72 of the jaws 64 with the broach stop shoulder 114, and the inward force imposed upon the jaws 64 by the springs 88, places an axial biasing force on the tool 105 to the right, FIG. 1, insuring a firm engagement between the surfaces 56 of the jaws 48 with the broach surface 112. Thus, the use of the jaw set 64 eliminates any axial lost motion or play between the broach tool 105 and the spindle, as previously occurred when only the jaws 48 were used.

Of course, it is necessary that torque forces be transferred from the spindle to the broach tool, and for this purpose the broach tool 105 is provided with keyways or splines for association with complementary surfaces defined in the spindle head 34, not shown.

When it is desired to remove the broach 105 from the spindle socket 36 the spindle assembly is moved to the right for engagement with the stop ring 96 as shown in FIG. 3 to align the jaw surfaces 58 of jaws 48 with the cam sleeve surface 84, and the jaws 64 will be in alignment with the recess 82. Thereupon, upon withdrawal of the tool 105 from the socket 36 sequential engagement of the stop shoulder 112 with the jaws 48 and 64 will radially displace the jaws outwardly and the tool may be readily removed from the spindle socket.

It will therefore be appreciated that by the use of the set of jaws 48 and the set of jaws 64 that play and axial lost motion between the broach and spindle assembly may be completely eliminated, and the biasing force imposed upon the jaws 64 by the compression springs 88 will insure zero clearance permitting a broaching tool constructed in accord with the invention to operate at much closer tolerances than previously possible.

It is appreciated that various modifications to the inventive concepts may be apparent to those skilled in the art without departing from the spirit and scope of the invention.

I claim:

1. Broach pulling apparatus for an elongated broach having an axis and a retaining end region, a blade region and a retaining end, an axially extending recess located within the retaining end region axially defined by a first surface oblique to the broach axis located toward the retaining end and a second surface oblique to the broach axis located toward the blade region, an axially displaceable spindle having a socket defined therein substantially coaxial with the spindle axis selectively receiving the broach retaining end region, an axially fixed radially displaceable first set of jaws located within the spindle each movable between an extended inner position engaging the recess first surface and a retracted outer position removing the jaws from the recess, and first jaw operating means located adjacent the spindle for radially displacing the first jaws between the extended and retracted positions, the improvement comprising, a second set of axially fixed radially displaceable jaws located within the spindle axially spaced from the first set of jaws and each movable between an extended inner position engaging the recess second surface and a retracted outer position removing the jaws from the recess, and second jaw operating means located adjacent the spindle for radially displacing said second jaws between the extended and retracted positions, simultaneous engagement of the first set of jaws and said second set of jaws with the first and second recess surfaces, respectively, locking a broach within the spindle socket against relative axial displacement with respect to the spindle.

2. In broach pulling apparatus as in claim 1, said second jaw operating means comprising an annular collar axially displaceable with respect to the spindle, said collar being mechanically connected to said second set of jaws whereby displacement of said collar radially displaces said second set of jaws between their extended and retracted positions.

3. In broach pulling apparatus as in claim 2, a cam surface defined upon said collar, said jaws of said second set each having an inner end adapted to engage the recess second surface and an outer end, a cam surface defined on each of said jaws outer end adapted to engage said collar cam surface, engagement of said collar and jaw cam surfaces displacing said second set of jaws inwardly toward the broach recess upon displacement of said collar in a first axial direction.

4. In broach pulling apparatus as in claim 2, the first jaw operating means and said second jaw operating means comprising a common annular collar circumscribing the spindle, said collar being mechanically connected to the first set of jaws whereby displacement of said collar also radially displaces the first set of jaws between their extended and retracted positions.

5. In broach pulling apparatus as in claim 4, each of the first set of jaws having an outer end having a cam surface and a locking surface defined thereon and an inner end adapted to engage the recess first surface, a locking surface defined on said collar axially spaced from said collar cam surface, said locking surface engaging said first jaws, locking surface when said collar is in said first axial position preventing outward radial movement of said first jaws when said collar cam surface is radially displacing said second jaws into engagement with said recess second surface.

6. In broach pulling apparatus as in claim 5, spring means biasing said collar in said first axial direction.

7. Broach pulling apparatus for an elongated broach having an axis and a retaining end region, a blade region and a retaining end, an axially extending recess located within the retaining end region axially defined by a first surface oblique to the broach axis located toward the retaining end and a second surface oblique to the broach axis located toward the blade region, an axially displaceable spindle having a socket defined therein substantially coaxial with the spindle axis selectively receiving the broach retaining end region, an axially fixed radially displaceable first set of jaws located within the spindle each movable between an extended inner position engaging the recess first surface and a retracted outer position removing the jaws from the recess, the improvement comprising, a second set of axially fixed radially displaceable jaws located within the spindle axially spaced from the first set of jaws each movable between an extended inner position engaging the recess second surface and a retracted outer position removing the jaws from the recess, an annular collar circumscribing the spindle adjacent the socket and axially displaceable between broach locking and broach release positions, a cam surface defined on said collar, a locking surface defined on said collar axially spaced from said cam surface, the jaws of the first and second jaw sets each including an outer end sequentially engaged by said collar cam surface as said collar is displaced from said release position to said locking position to engage the first and second jaws with the recess first and second surfaces, respectively, said outer ends of the first jaws engaging said collar locking surface and said second jaws engaging said collar cam surface when said collar is in said locking position preventing movement of the jaws toward a retracted position and axially fixing the broach relative to the spindle and means displacing said collar between said locking and release positions.

8. In broach pulling apparatus as in claim 7, compression spring means biasing said collar toward said broach locking position.

9. Broach pulling apparatus for an elongated broach having an axis and a retaining end region, a blade region and a retaining end, an axially extending recess located within the retaining end region including a first surface axially oblique to the broach axis in a first direction and located toward the retaining end, a second surface defined on the end region axially oblique to the broach axis in the direction opposite to that of the first surface located toward the blade region, an axially displaceable spindle having a socket defined therein substantially coaxial with the spindle axis selectively receiving the broach retaining end region, first radially displaceable broach locking means mounted on said spindle selectively engagable with the recess first surface only, the improvement comprising second radially displaceable broach locking means mounted on the spindle selectively engagable with the second surface only, and operating means for said radially displaceable locking means whereby engagement of said radially displaceable means with its associated oblique surface axially locks said broach with respect to said spindle.

10. In a broach pulling apparatus as in claim 9, said second radially displaceable locking means being biased into firm engagement with the second surface to eliminate clearance between the surfaces and their associated locking means.

* * * * *